United States Patent [19]

Sciamanna et al.

[11] Patent Number: 5,236,590
[45] Date of Patent: Aug. 17, 1993

[54] PROCESS FOR REMOVING DISSOLVED ORGANICS FROM AQUEOUS COMPOSITIONS

[75] Inventors: Steven F. Sciamanna, Moraga; Michael Dubrovsky, Berkeley, both of Calif.

[73] Assignee: Chevron Research and Technology Company, San Francisco, Calif.

[21] Appl. No.: 796,104

[22] Filed: Nov. 21, 1991

[51] Int. Cl.$^5$ .............................................. B01D 21/26
[52] U.S. Cl. ..................... 210/639; 210/724; 210/749; 210/360.1; 210/512.1; 210/787; 55/459.1; 55/460; 209/144; 209/211; 95/258; 95/266; 96/196
[58] Field of Search ............... 210/639, 787, 724, 749, 210/360.1, 512.1; 209/144, 211; 55/51, 191, 192, 459.1, 460

[56] References Cited

U.S. PATENT DOCUMENTS

| | | | |
|---|---|---|---|
| 4,397,741 | 8/1983 | Miller | 209/211 |
| 4,401,570 | 8/1983 | Blytas et al. | 210/639 |
| 4,839,054 | 6/1989 | Ruebush et al. | 210/639 |
| 4,936,990 | 1/1990 | Brunsell et al. | 210/360.1 |
| 4,964,994 | 10/1990 | Wakley et al. | 210/512.1 |
| 5,062,955 | 11/1991 | Sciamanna | 210/512.1 |
| 5,064,448 | 11/1991 | Choi | 55/51 |
| 5,116,488 | 5/1992 | Torregrossa | 210/512.1 |

OTHER PUBLICATIONS

Evans, J., "High-Pressure Carbon Dioxide Successful in Removing Oil from Brine," Separations Update published by the Center for Energy Studies, Summer 1990-p. 2.

Fair, et al. "Removal of Petroleum Hydrocarbons from Oil-Field Brines by Critical Fluid Extraction," Annual Report 1988 published by the Separations Research Program Center for Energy Studies, Apr. 1090-pp. 42-43.

Little, et al. "Critical Fluid Extraction of Hydrocarbons from Oil-field Brines," published by the Separations Research Program, Early 1990.

Information entitled Agenda SRP Spring Conference, Separations Research Program, Center for Energy Studies, Apr. 10, 1990.

*Primary Examiner*—Robert A. Dawson
*Assistant Examiner*—David Reifsnyder
*Attorney, Agent, or Firm*—R. J. Sheridan; W. K. Turner

[57] ABSTRACT

A process is disclosed for removing dissolved organics from an aqueous composition, said composition comprising water, carbon dioxide and dissolved organics, and said composition having a pH of 6.5 or less and an inlet organics concentration. The process comprises the steps of feeding said aqueous composition to a centrifugal separation zone, preferably to a hydrocyclone, depressurizing said composition in said centrifugal separation zone to regasify at least a portion of said carbon dioxide. An aqueous product stream is removed from the centrifugal separation zone wherein the concentration of said organics is less than said inlet organics concentration. The process is particularly useful in the cleanup of industrial wastewater, and also for removing organics from water produced in petroleum production operations.

18 Claims, 4 Drawing Sheets

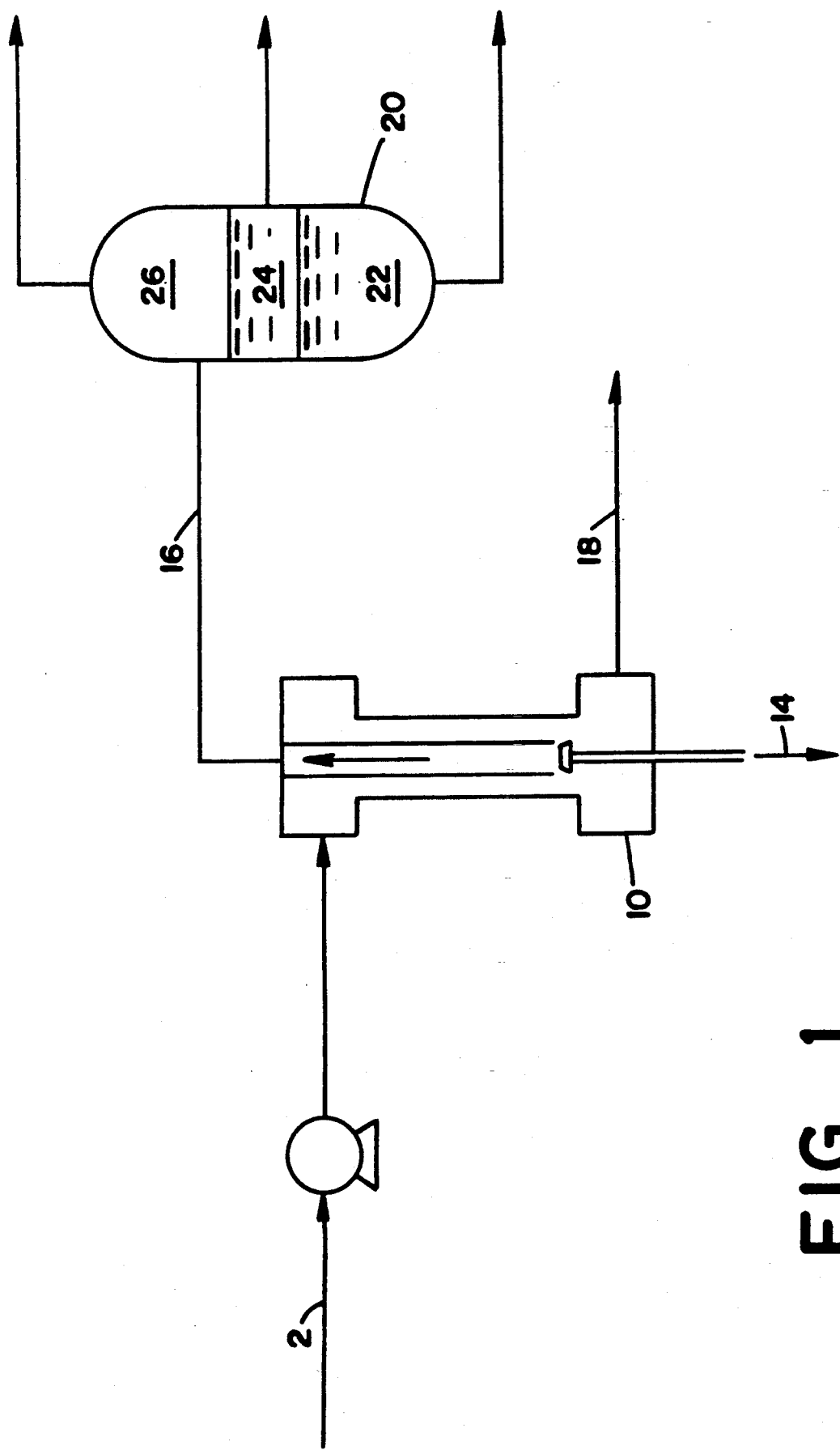

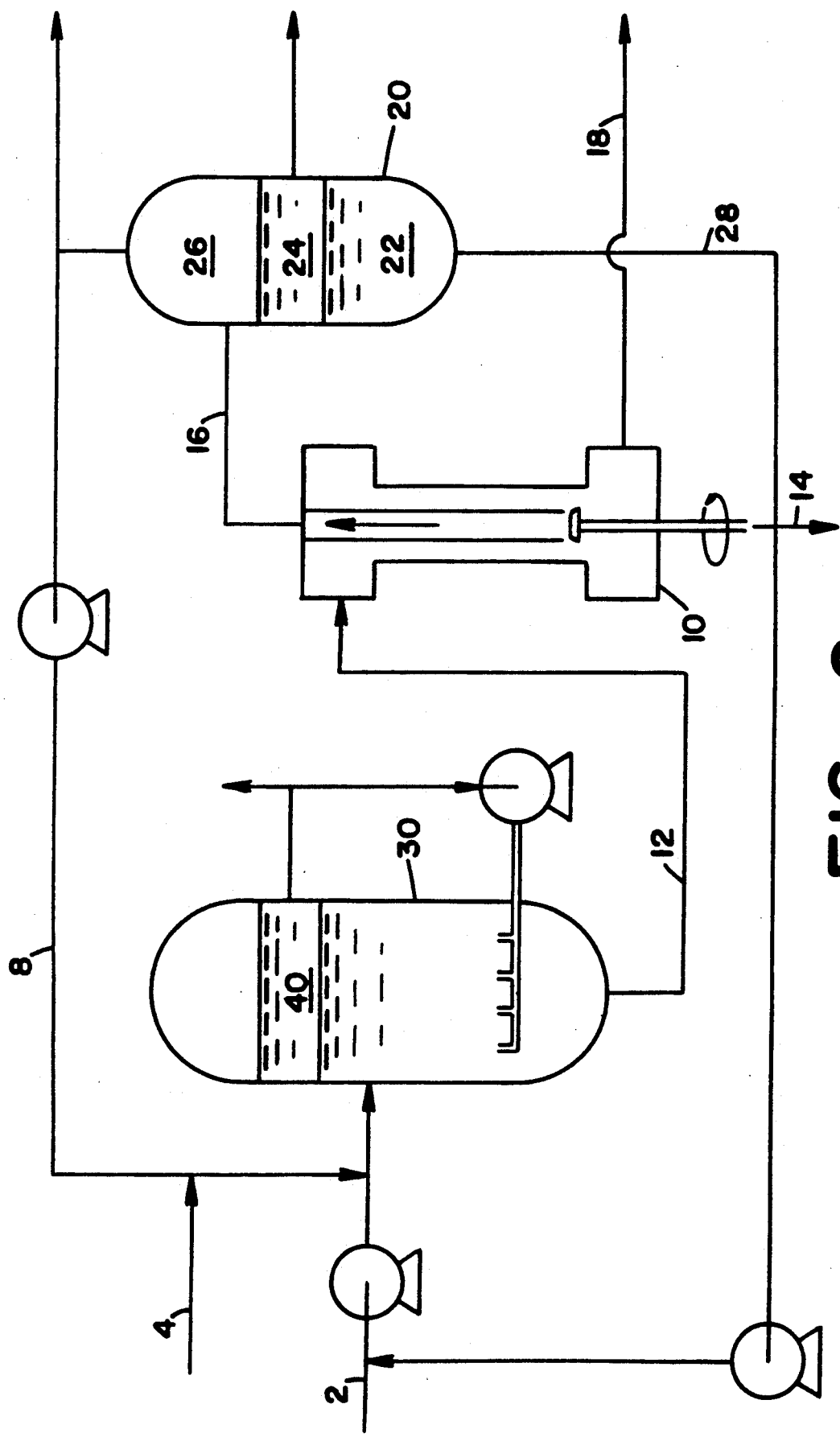
FIG_2

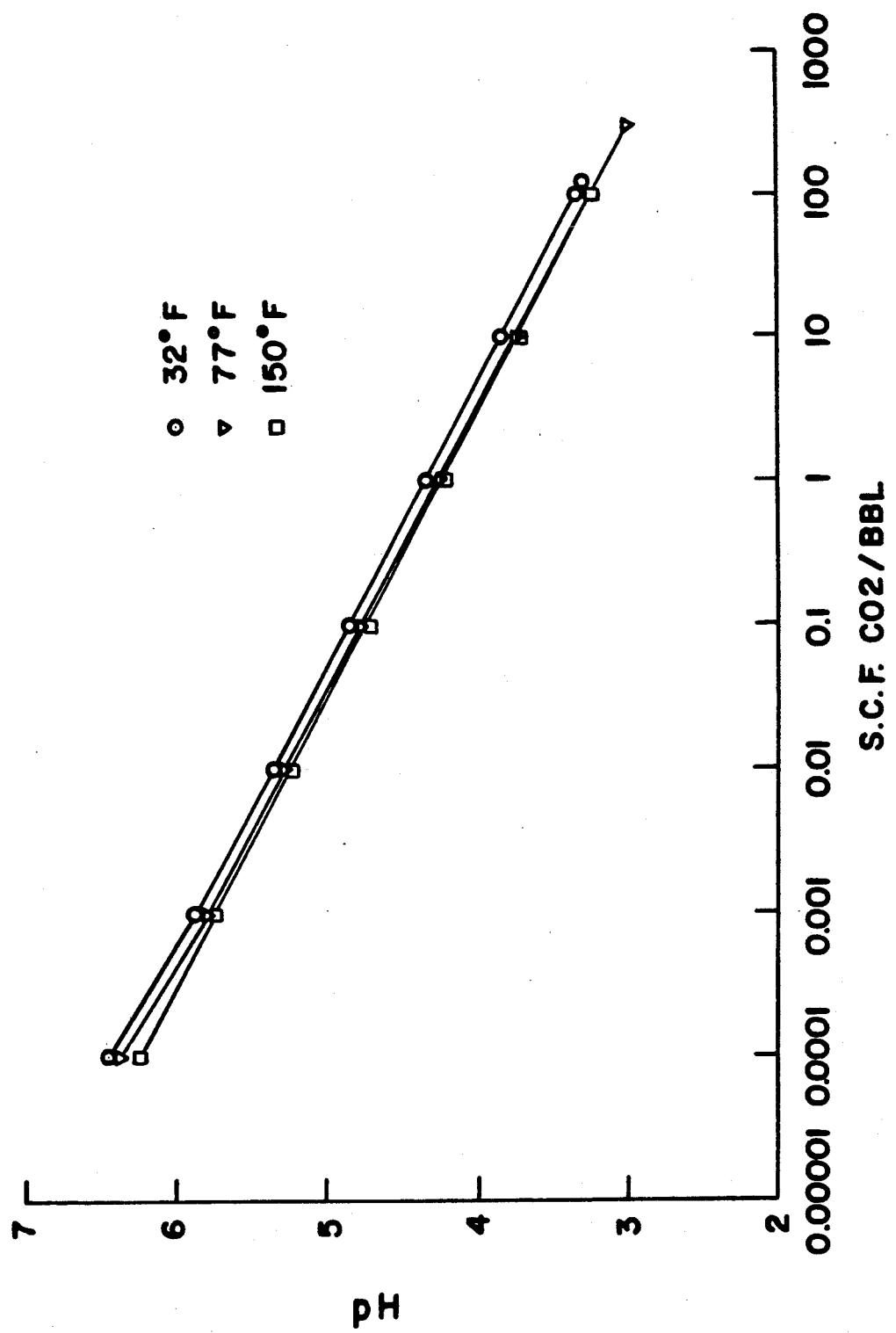

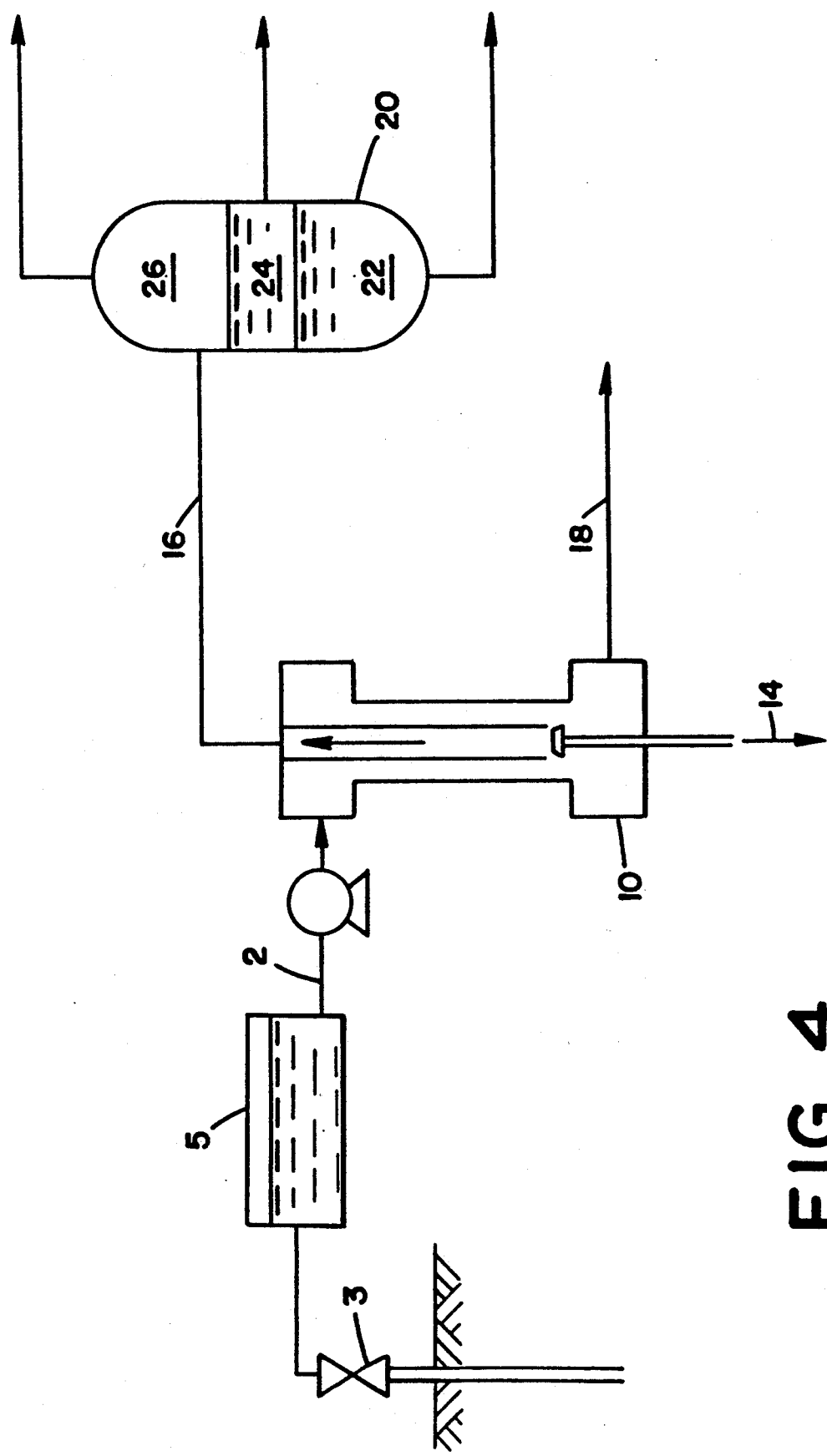
FIG_4

PROCESS FOR REMOVING DISSOLVED ORGANICS FROM AQUEOUS COMPOSITIONS

FIELD OF INVENTION

The present invention relates to a process for the separation and removal of undesirable dissolved organic compounds present in a water stream from an industrial process.

BACKGROUND

A variety of industrial processes generate aqueous streams containing contaminating amounts of organic compounds. Before such streams can be discharged into a receiving body of water, the organics content must be substantially reduced to meet environmental regulatory standards.

For example, offshore oil platform operations may generate produced water streams. Some produced water contains naturally-occurring brines associated with and in contact with naturally-occurring petroleum in subsurface reservoirs and is produced as a consequence of producing the petroleum. The water may contain significant amounts of dissolved organic acids and other contaminating hydrocarbons. A particular problem with this type of produced water is that often carboxylic acid salts such as salts of naphthenic acids may be present. If not removed, these contaminants are measured as oil and grease when the water is tested pursuant to EPA gravimetric test methods. Thus, it is desirable to treat such water so that it may be discharged without exceeding Environmental Regulatory Standards for effluent water, which often require effluent concentration of organic pollutants which are below the solubility limit for the organic compounds in water.

Other examples of oily waters may include any number of streams emanating from a commercial facility, such as, for example, an oil refinery or chemical production plant, or a facility which utilizes petroleum fuel oils say, for instance, electric power plants for which fuel oil must be desalted in a counter current water washing process. Water produced with crude oil or natural gas in oil and gas producing operations are also examples of oily waters.

The above described produced and oily waters are not adequately treated by mechanical means, settling (i.e. gravity separation) or conventional floatation techniques. We have found conventional oil/water separation techniques to be inadequate in removing these water-soluble organics.

The aqueous compositions resulting from these treatment processes often contain very small suspended hydrocarbon particles, and often dissolved hydrocarbons in the continuous water phase.

Previous attempts have been made to remove dissolved organic contaminants by acidification. For example, U.S. Pat. No. 4,401,570 issued August 1983 to Blytas et al., discloses a method of removing organic esters from waste water using acidification. However merely acidifying the water has been found inadequate, to effect a separation of these dissolved organics.

In U.S. Pat. No. 4,839,054, issued Jun. 13, 1989 to Ruebush et al., a better separation of dissolved organics from a produced water is described through acidifying the produced water with a strong acid, contacting the acidified water with a free oil to form a mixture, agitating and separating the phase to produce a free oil phase and a clean water phase. The requirements of materials of construction resistant to strong acids, and lack of a fully effective means of coalescing droplets of previously dissolved organics coming out of solution, make the process described in U.S. Pat. No. 4,839,054 less than fully commercially attractive.

Recently, improved mechanical means, specifically, improved rotary vortex or hydrocyclone separators have been used to separate heterogeneous liquids such as water with a small oil content on offshore oil platforms. A cyclonic separator or hydrocyclone is a piece of equipment which utilizes fluid pressure energy to create rotational fluid motion. This rotational motion causes relative movement of less-dense particles suspended in the fluid thus permitting separation of particles, one from another or from the fluid. In some cases, the less dense particles are fluid droplets dispersed in another, different density fluid. In liquid-liquid hydrocyclones, the rotational fluid motion is produced by tangential injection of fluid under pressure into a vessel. The vessel at the point of entry for the fluid is usually cylindrical and can remain cylindrical over its entire length though it is more usual for it to become conical. Hydrocyclones have also been used extensively as gravity separators in coal preparation plants and the minerals processing industries. Two general categories of hydrocyclones are used for gravity separation.

One such floatation apparatus for obtaining separation of fine particles in a centrifugal field is described in U.S. Pat. No. 4,399,027 issued Aug. 16, 1983 to Miller.

Another hydrocyclone separator described as useful in separating small quantities of oil from large streams of discharged water is described in U.S. Pat. No. 4,964,994 issued Oct. 23, 1990 to Wakley et al.

A significantly improved centrifugal field separator; a rotating sleeve hydrocyclone is described in U.S. patent application Ser. No. 07/530,877 filed May 30, 1990, now U.S. Pat. No. 5,062,955, assigned to the assignee of the present invention. The hydrocyclone disclosed in U.S. application Ser. No. 07/530887 is particularly useful in handling the separation of fluids in the presence of gas. The disclosure of U.S. patent application Ser. No. 07/530,877 is fully incorporated by reference herein.

Neither the aforementioned strong acid acidification and oil sponge process, nor the improved hydrocyclonic separators alone are fully effective in removing dissolved and/or very finely dispersed organic droplets, in a commercially feasible process.

Therefore, an improved process for removal of dissolved organics from industrial waters is much desired.

SUMMARY OF THE INVENTION

In accordance with the present invention, a continuous process is set forth for removing dissolved organic compounds from industrial water streams. In its broadest sense, our invention is a process for removing dissolved organics from an aqueous composition, said composition comprising water, carbon dioxide and dissolved organics, and said composition having a pH of 6.5 or less and an inlet organics concentration.

The process comprises the steps of feeding said aqueous composition to a centrifugal separation zone, depressurizing said composition in said centrifugal separation zone to regasify at least a portion of said carbon dioxide, removing from said centrifugal separation zone an overhead product stream, said overhead product stream comprising a portion of said organics, and removing from said centrifugal separation zone an aqueous product comprising water and organics wherein the concentration of said organics is less than said inlet organics concentration.

Among other factors we have found the pH-lowering effect from dissolution of carbon dioxide affects a phase splitting of acidic-organics from the water phase.

Surprisingly, we found the carbon dioxide re-entering the gas phase had an effective scavenging effect on the organic droplets as the carbon dioxide, once nucleating on the organic droplets, migrate toward the gas phase in the centrifugal field separator. Because there is a dissolved carbon dioxide gradient across the centrifugal field separator, the organics normally do not have time to redissolve. Our present invention recognizes and takes advantage of the fact redissolution of organics in water proceeds at a much slower rate than the time for separation.

Furthermore, in a preferred embodiment we have found the use of a rotating-sleeve, gas-core hydrocyclone to be very effective in the practice of the present invention by controlling the amount of oil and water in the overflow of the hydrocyclone, thus allowing more effective control of the overall separation process.

BRIEF DESCRIPTION OF THE DRAWINGS

FIG. 1 is a process flow diagram of the preferred hydrocyclone embodiment of our present invention.

FIG. 2 is a process flow diagram of additional embodiments of our invention including additional features which include recycle and sponge oil surge vessel.

FIG. 3 is a graphical representation of the solubility of carbon dioxide in water versus pH at various temperatures.

FIG. 4 is a process flow diagram of a second preferred embodiment of our present invention.

DETAILED DESCRIPTION

We have invented a process for removing dissolved organics from a water stream which contains dissolved carbon dioxide sufficient to lower the pH of the stream to 6.5 or less by depressurizing the stream in a centrifugal separation zone across a centrifugal field separator, or preferably a hydrocyclone capable of accommodating a gas core, to cause said carbon dioxide to re-gasify, and subsequently removing an aqueous product having a dissolved organics concentration less than that of the aqueous stream feeding to the centrifugal separation zone.

By the term "dissolved organics", we mean to include waters-soluble organics. It is conventional to denote the water-soluble organics found in and recovered from petroleum, or petroleum processes, generally as "petroleum acids" and more specifically as "naphthenic acids". In general, the water soluble organics are dissolved metal salts of oxygenated hydrocarbons, alkane acids, and cyclic acids, specifically carboxylic acid salts and long-chain organic acid salts. Chemically, the petroleum acids are monocarboxylic acids related to the naphthene (alicyclic) series of hydrocarbons. Often, they are naphthenic acids salts. The naphthenic acid salts are defined as monocarboxylic acids of the naphthene series of hydrocarbons. Their general formula may be written $R(CH_2)n$ COOH where R is a cyclic moiety composed of one or more rings. These rings are usually 5-membered (cyclo-pentene) and may be alkylated. However, other petroleum acidic substances are included. For example, substituted phenols, mercaptans, long-chain ketones, etc. may act as petroleum acids in the sense of our present invention. Petroleum acids are natural components of crude oil and are not formed by refining. Naphthenic acids occur in almost all crudes in widely varying amounts. The acid content of a variety of American crudes runs from about 0.03 to 3.0 wt. %. In general, the lower the paraffin content, the higher the acid content. In the typical practice of our present invention, the incoming aqueous compositions contains from about 20 ppm to 1000 ppm of dissolved organics.

By the term "centrifugal field separator", we mean any number of cyclonic separators or hydrocyclones which operate on a principle of phase separation of one or more fluids in a centrifugal force field. One class of such device; the cyclonic separator or hydrocyclone is a piece of equipment which utilizes fluid pressure energy to create rotational fluid motion. This rotational motion causes relative movement of particles suspended in the fluid, thus permitting separation of particles, one from another, or from the fluid. The rotational fluid motion is produced by tangential injection of fluid under pressure into a vessel. The vessel at the point of entry for the fluid is usually cylindrical and can remain cylindrical over its entire length though it is more usually to become conical. It is the conical shape which imparts rotational inertia to the fluid.

"Centrifugal field separator" also includes non-cyclonic devices which utilize centrifugal force to accelerate the separation process. One such devise is disclosed in U.S. Pat. No. 4,936,990 issued Jun. 26, 1990 to Brunsell.

"Centrifugal separation zone" is that part of the process of our present invention between the inlet aqueous composition feed and the aqueous product, which comprises the centrifugal field separator.

A preferred centrifugal field separator for the practice of the present invention also incorporates a rotating sleeve component to provide maximum separation, and more adequately handles entrained gaseous species in the fluid to be separated. Such a device incorporating a rotating sleeve component is described fully in U.S. patent application Ser. No. 07-530,877, filed May 30, 1990, now U.S. Pat. No. 5,062,955, and assigned to the assignee of our present invention.

By the term "clean water stream", we mean a water stream having an organics concentration of 80 ppm or less as measured by U.S. Environmental Protection Agency gravimetric test method No. 413.1.

Referring now to FIG. 1, the process of our present invention provides for a aqueous stream 2 comprising suspended hydrocarbon particles, dissolved organics, or a combination thereof to be depressurized from a pressure of at least 125 psig in a centrifugal field separator 10 in the centrifugal separation zone. The pH of the water stream is less than 6.5, preferably less than 5.0. The centrifugal separation zone comprises a centrifugal field separator 10, which in a preferred embodiment is a hydrocyclone. More preferred is a rotating sleeve hydrocyclone, most preferably a rotating sleeve hydrocyclone able to accommodate a gas core. In the most preferred embodiment, gas relief means 14 is provided to adjust the diameter of the gas core within the hydrocyclone. Such adjustment provides for better control of the separation process by optimally maintaining the liquid-liquid interface in the rotating column of fluid. An aqueous product stream 18 flows from the centrifugal field separator to, for example, a disposal well or a water recovery facility. An overflow stream 16 flows, in one embodiment, to separator 20, which may be any conventional multi-phase separator well known to those in the art. In separator 20, a water phase 22, hydrocarbon phase 24, and a primarily carbon dioxide gaseous phase 26 are maintained. Water from the water phase 22 is withdrawn from the lower portion of separator 20, and hydrocarbon is withdrawn from the upper portion of the liquid phase. Pressure is maintain in separator 20 by withdrawing primarily carbon dioxide gas from gaseous phase 26.

Referring now to FIG. 2, further embodiments of our invention may be described. For an aqueous composition stream 2, which does not contain sufficient carbon dioxide to result in a water pH of less than 6.5, carbon dioxide may be introduced to the stream prior to depressurization in the centrifugal seperation zone which comprises centrifugal field separator 10. For this carbon dioxide mixing embodiment, carbon dioxide may be a portion of carbon dioxide vented from separator 20, as indicated by stream 8 or carbon dioxide from any source including a mixture of carbon dioxide and light hydrocarbon gas as indicated by stream 4. It will be recognized that for an aqueous composition at or near atmospheric pressure, insufficient carbon dioxide will be dissolved. In such a case, for the practice of our invention, carbon dioxide recycled from separator 20 and including a bleed of the separation 20 vent stream and make-up of fresh carbon dioxide may be utilized. The pH resulting from dissolution of carbon dioxide in water at various water temperatures is represented by FIG. 3. From FIG. 3 it can be seen that at 0.1 S.C.F. of $CO_2$ per BBL of water, an aqueous composition of pH less than 5.0 results.

In another embodiment, water from water 22 in separator 20 may optionally be recycled via stream 28 to be mixed with incoming aqueous composition 2.

In yet another embodiment of our invention, the incoming water stream containing sufficient dissolved carbon dioxide to have a pH of less than 5.0 is introduced to vessel 30 containing a quantity of crude oil or "sponge oil", circulated and in fluid communication with the acidic aqueous composition comprising dissolved organics. Vessel 30 is preferably located upstream in the process of the centrifugal separation zone. The sponge oil 40 is most preferably a crude oil having a gravity in the range of between about 22 API to 36 API. Sponge oil vessel 30 provides in this embodiment primarily two advantageous features. Firstly, the water now being under pressure and containing dissolved $CO_2$ sufficient to have a pH of less than 5.0 will not support the dissolution of formerly dissolved organics therein. In vessel 30, sponge oil 40 is circulated to promote the contacting with the formerly dissolved organic droplets. Thus the separation load on centrifugal field separator 10 is minimized and the effectiveness thereof increased. Secondly, sponge oil vessel 30 provides a degree of surge protection and process flow stability in the overall process. In this embodiment, feed to centrifugal separator 10 is from the water phase of vessel 30 as indicated in FIG. 2 by stream 12.

Any number of ionic polymers which are known to assist in the separation of water and hydrocarbon may optionally be introduced in the process at any point upstream of the centrifugal field separator.

In yet another embodiment of our present invention, incoming aqueous composition 2 comprises produced water from a hydrocarbon-containing reservoir. The production system from the wellhead 3, as shown in FIG. 4 in an alternate preferred embodiment of our invention will maintain pressure on the produced wellhead fluids sufficient to keep any napthenic salts or other water soluble organic compounds present in the hydrocarbon reservoir fluids from becoming dissolved organics in the water phase as defined herein.

In the most preferred embodiment, the aqueous composition to the centrifugal separation zone is the water phase from a three-phase separator 5 treating production fluids from a wellhead. Such three-phase separators are well-known to those skilled in the art of petroleum production. Such separators are operated under pressure and sufficient carbon dioxide will remain in solution to maintain the pH of the solution less than about 6.5 to the feed of the centrifugal field separator, provided such pressure is maintained in the feedstream the centrifugal separator, indicated in FIG. 3 by stream 2.

Examples of such production separators include, but are not limited to, vertical separators, free-water "knock-outs" or "heater-treaters", which typically operate at pressures above atmospheric pressure, most typically above 15 psig. Often, sufficient carbon dioxide is dissolved in the water phase of gross fluid produced from a well such that the pH of the fluid is maintained in the acidic range until said de-pressurizing step in accordance with our invention.

One skilled in the art will recognize that various pumps and flow control devices are necessary at various points throughout the process. For ease and clarity of description, however, such pumps and flow control devices have not been expressly provided for in the present description. It will also be recognized that for the embodiment requiring addition of carbon dioxide to the aqueous composition, or when sufficient carbon dioxide exists in the aqueous composition feed stream to the centrifugal separation zone, the flow rate of carbon dioxide to be mixed with incoming water will be determined through the monitoring of, among other factors, the incoming stream flow rate, and the pH of the stream following having carbon dioxide dissolved therein.

While our invention has been described in connection with specific embodiments thereof, it will be understood that it is capable of further modification, and this patent application is intended to cover any variations, uses, or adaptation of the invention following, in general, the principles of the invention and including such departures from the present disclosure has come within the known or customary practice in the art to which the invention pertains and as may be applied to the essential features herein before set forth, and as fall within the scope of the invention and the limits of the appended claims.

What is claimed is:

1. A process for removing dissolved organics from an aqueous composition, said composition comprising water, and dissolved organics, and said composition having an inlet dissolved organics concentration, said process comprising the steps of:
    (a) mixing a stream which comprises at least one weight percent carbon dioxide with said aqueous composition to lower the pH of said aqueous composition to less than about 6.5 and feeding said aqueous composition to a centrifugal separation zone comprising a centrifugal separator,
    (b) depressurizing said composition in said centrifugal separator to regasify at least a portion of said carbon dioxide, (c) removing from said centrifugal separation zone an overhead product stream, said overhead product stream comprising a portion of said dissolved organics, and;

(d) removing from said centrifugal separation zone an aqueous product comprising water wherein the concentration of dissolved organics in said aqueous product is less than said inlet dissolved organics concentration.

2. The process as recited in claim 1 wherein said aqueous composition further comprises oil produced from a hydrocarbon reservoir.

3. The process as recited in claim 1 wherein said centrifugal separation zone comprises a hydrocyclone.

4. The process as recited in claim 3 wherein said hydrocyclone is a rotating-sleeve hydrocyclone capable of accommodating a gas core.

5. The process as recited in claim 4 wherein the volume of said gas core is controlled.

6. The Process as recited in claim 3 further comprising a gravity separation vessel located downstream of said hydrocyclone from which said gravity separation vessel a stream comprising at least one weight percent carbon dioxide is removed.

7. The process as recited in claim 6 wherein at least a portion of said substantially carbon dioxide gas phase is recycled to be mixed with said aqueous composition.

8. The process as recited in claim 6 wherein a substantially water phase is removed from said gravity separation vessel and at least a portion of said substantially water phase is recycled to said aqueous composition prior to feeding said aqueous composition to said centrifugal separation zone.

9. The process as recited in claim 1 further comprising the step of contacting said aqueous composition with sponge oil prior to said feeding step.

10. The process as recited in claim 9 wherein said sponge oil is circulated countercurrent to said aqueous composition in a sponge oil vessel.

11. The process as recited in claim 10 further comprising the step of mixing a portion of additional sponge oil with said aqueous composition prior to contacting said aqueous composition said sponge oil in said sponge oil vessel.

12. The process as recited in claim 9 wherein said sponge oil comprises crude oil having an API gravity of between 22 and 35.

13. The process as recited in claim 1 wherein said aqueous composition is at ambient temperature.

14. The process as recited in claim 1 wherein the pH of said aqueous composition is less than 5.0.

15. The process as recited in claim 1 wherein said aqueous product has an dissolved organics concentration of less than 80 ppm.

16. The process as recited in claim 1 wherein said aqueous composition comprises at least a portion of the water phase of a production stream from a wellhead in a hydrocarbon production process.

17. A hydrocarbon production process for producing hydrocarbons from a hydrocarbon-containing reservoir, comprising the steps of:

(a) producing to a wellhead a production stream, said production stream comprising oil, produced water and carbon dioxide dissolved in said produced water sufficient to acheive a pH in said water of less than 6.5;

(b) separating a substantially-water phase comprising water and carbon dioxide from said production stream in a production separator;

(c) maintaining pressure on said production stream from said wellhead to said production separator and on said substantially-water phase from said production separator to a centrifugal separation zone to maintain said dissolved carbon dioxide in solution to maintain the pH of said aqueous water phase less than 6.5;

(d) feeding said substantially water phase to said centrifugal separation zone;

(e) depressurizing said substantially water phase in said centrifugal separation zone to regasify at least a portion of said carbon dioxide; and, (f) removing a clean water stream from said centrifugal separation zone.

18. The process as recited in claim 17 wherein said production separator is a three-phase separator.

* * * * *